United States Patent [19]

Hawkins

[11] Patent Number: 5,960,930
[45] Date of Patent: Oct. 5, 1999

[54] POWER COATING PAINTING APPARATUS WITH CONVEYOR SYNCHRONIZATION AND ANTI-JAMMING MEANS

[75] Inventor: Brian Thomas Hawkins, Martinsville, N.J.

[73] Assignee: George Koch Sons, Inc., Evansville, Ind.

[21] Appl. No.: 08/880,733

[22] Filed: Jun. 23, 1997

[51] Int. Cl.[6] .................................................. B65G 37/00
[52] U.S. Cl. .......................................... 198/577; 198/575
[58] Field of Search ................................... 198/575, 576, 198/577, 460.1, 464.1

[56] References Cited

U.S. PATENT DOCUMENTS

| | | |
|---|---|---|
| 4,075,011 | 2/1978 | Iwasa et al. . |
| 4,601,743 | 7/1986 | Canfield . |
| 4,717,013 | 1/1988 | Reissmann et al. . |
| 4,921,092 | 5/1990 | Crawford et al. ............... 198/575 X |
| 4,957,532 | 9/1990 | Jacobsen et al. . |
| 5,000,985 | 3/1991 | Salisbury . |
| 5,058,727 | 10/1991 | Jahns et al. ...................... 198/577 X |
| 5,186,308 | 2/1993 | Munro . |
| 5,228,558 | 7/1993 | Hall .................................. 198/575 X |
| 5,264,037 | 11/1993 | Salisbury . |
| 5,318,167 | 6/1994 | Bronson et al. .................... 198/577 |
| 5,358,464 | 10/1994 | Funk et al. ....................... 198/577 X |

FOREIGN PATENT DOCUMENTS

| | | |
|---|---|---|
| 58-139910 | 8/1983 | Japan . |
| 7615 | 1/1984 | Japan ................................. 198/576 |
| 61-257814 | 11/1986 | Japan . |
| 2-75514 | 3/1990 | Japan . |

OTHER PUBLICATIONS

Peter Gribble, Products Finishing—"Coat it Now, Form it Later", *Products Finishing Magazine*; Feb., 1994.

Nordson Corp., European Div., Stockport, England, Thermal Innovations Corp., Manasquan, N.J., & TRIAB/Tri Innovations, Mölndal Sweden, "Jolly good test results show British appliance maker the benefits of blank coating"; *Powder Coating*, Jun. 1991.

Curtis Leach, "The Preparation, Powder Coating and Curing of Pre–Cut Metal Sheets for Postforming"; *Powder Coating Conference Proceedings*, Cincinnati, Ohio, Oct. 11–13, 1994 pp. 57–67.

*Primary Examiner*—James R. Bidwell
*Attorney, Agent, or Firm*—Barnes & Thornburg

[57] ABSTRACT

A conveyor system for transporting parts through a plurality of processing areas. The conveyor system has a plurality of motor driven conveyors, each of the conveyors for transporting parts through an associated one of the processing areas. Digital motor shaft encoders are provided for monitoring the speed of the conveyor motors. Motor speed controllers are electrically coupled to the encoders and are responsive thereto, for regulating the speed of the conveyors thereby synchronizing the speed among all of the conveyors. A computer is electrically coupled to one of the motor speed controllers for providing a predetermined conveyor system speed set point. Part detectors are electrically coupled to the computer, for verifying each part's progress along each of the conveyors thereby enabling the computer to track the movement of each part transported along the conveyor system to detect part to part collisions.

18 Claims, 1 Drawing Sheet

POWER COATING PAINTING APPARATUS WITH CONVEYOR SYNCHRONIZATION AND ANTI-JAMMING MEANS

FIELD OF THE INVENTION

The present invention relates to mass production painting apparatus and more specifically, to a continuously running, conveyorized powder coating apparatus having conveyor synchronization and anti-jamming features.

BACKGROUND OF THE INVENTION

In the early 1970's, the consumer products industry began substituting powder coatings for liquid and porcelain coatings on sheet metal based enclosures used in consumer products. For example, powder coatings are used on washer tops and lids, dryer interiors, microwave cavities, air conditioner wrappers, and office furniture. This was done to achieve better performance, increase coating application efficiency and to comply with new state VOC regulations.

Mass production of such consumer products has been previously accomplished by painting (both liquid and powder coating) the metal enclosures and the like, after the sheet metal used for the enclosure has been cut and formed into final, desired shape. This type of product finishing process is known as pre-forming.

Over approximately the last decade in the appliance industry, finishing methods have been changing. This change has been driven by the need to improve quality and reduce finishing costs. In particular, the appliance industry has successfully implemented a method commonly referred to as the "coil process." The coil process utilizes steel coils that have been pre-painted using liquid or powder coatings, prior to cutting and forming. The coil process has provided appliance manufacturers with substantial finishing cost reductions. The coil process requires that the manufacturer purchase the steel coil with the coating already applied by means of high speed, high cost, coil coating equipment.

While appliance manufacturer's have enjoyed the reduced cost benefits of this precoating/coil process, there are some major disadvantages that are associated with it. These disadvantages include the inability to control coating quality; bare, unpainted edges that reduce overall final product quality due to premature edge corrosion; and coated metal scrap which has a negative environmental impact. Other disadvantages stem from the complex nature of the high-production coil coating equipment, which requires a large capital investment on the order of 80–100 million dollars. Such large capital expenditures stifle supplier competition and inhibit further cost reduction. Furthermore, the high speed coating lines (350 feet per minute plus) associated with the coil process, require the use of solvent based coatings which negatively impact the environment and increase raw material costs.

These and other disadvantages have prevented the coil process from becoming the primary finishing method in the appliance industry and the like. In particular, only about 5–7% of all appliance enclosures are produced using the coil process.

The appliance industry has attempted to overcome these disadvantages, by utilizing pre-cut blanks of sheet metal which are then processed and powder coated using a high speed conveyorized transport system on the manufacturing site prior to forming into the final enclosure shape. This process is commonly referred to in the industry as the "blank powder coat finishing process."

In the blank powder coat finishing process, metal is blanked or precut into individual substrates which each have all their requisite pierces, notches and the like formed in them. This provides the advantage of having all the desired metal cutting performed prior to painting. Thus, all cut edges are powder coated thereby eliminating the presence of bare edges, which are a major source of corrosion. By comparison, the coil process cuts the metal after it is painted, which exposes bare edges, as well as generates scrap that is costly to the manufacturer and detrimental to the environment.

After blanking, each substrate is cleaned and pretreated with a chemical conversion coating; and then powder coated. The application of powder to the flat substrate (pre-coating) provides many advantages over post-coating of formed parts. For instance, the transfer efficiency can be high enough that reclaim overspray powder may not be necessary, especially with present state of the art application equipment. This reduces capital equipment costs and facilitates color changes. Further, pre-coating substantially flat blanks allows for greater film thickness control when compared to post-coating of formed parts since, the geometric complexity of the formed part makes its difficult to maintain the thickness of the paint film.

Once powder coated, the blanks are rapidly cured using infrared (IR) heating for part or all of the curing cycle. Rapid curing schedules enable the advantages of the blank process to be fully realized since, rapid curing allows substantial reductions in floor space. The IR heating allows very rapid upheat to the requisite powder curing temperatures. Accordingly, bake schedules of less than 60 seconds are possible which allows for typical IR oven lengths of as short as 50 feet. Additionally, since powder coatings are solvent free, they are well suited for short curing schedules where fast upheat rates are required, and produce exceptionally smooth films. With such rapid paint curing times, "blanking" line speeds are very high and can range from 50 to 80 feet per minute.

The fully cured painted blanks can be stacked for future use or immediately formed in existing forming equipment. In many cases, forming involves very sharp bends and/or metal drawing. Compared with liquid coatings, powder coatings have an exceptional balance of hardness and flexibility.

One can see that the blank powder coat finishing process substantially addresses all of the disadvantages of the coil process while providing similar or better cost reduction on a per part basis compared to the coil process. This is because blank powder coating systems require a capital investment on the order of only 3–10 million dollars, which is directly proportional to production tonnage requirements.

As mentioned earlier, the blanking line speeds in a typical blank powder coat finishing process can approach between 50 and 80 feet per minute. Such high line speeds require synchronization and accurate speed control of the high speed transport system to provide consistent substrate exposure time to pretreatment chemicals, cure time, and for uniform thickness of the thin film powder coating. Moreover, such high line speeds often result in jam-ups which cause lines stoppages and thus, reductions in throughput.

The synchronization and speed control of high speed conveyorized transport systems used in blank powder coat finishing processes is accomplished by employing transport system operators. These operators continuously monitor the transport system for jam-ups to maintain synchronization and control the speed of the system. When a jam-up occurs, they must quickly recognize it and clear it to minimize stoppages and maintain product throughput. Moreover, since the line speed of the system is so high, when a jam-up does occur, operator response time is very critical in keeping the size of the jam-up to a minimum. If an operator hesitates in responding to a jam-up, it will take longer to clear the jam-up thereby reducing product throughput.

Accordingly, a need still exists for improved synchronization and speed control of the high speed conveyorized transport systems used in blank powder coat finishing processes.

SUMMARY OF THE INVENTION

In accordance with the present invention, a conveyor system for transporting parts through a plurality of processing areas. The conveyor system comprises a plurality of conveyors, each of the conveyors for transporting parts through an associated one of the processing areas. Speed monitoring means are provided for monitoring the speed of the conveyors. Speed control means are electrically coupled to the speed monitoring means and responsive thereto, for regulating the speed of the conveyors thereby synchronizing the speed among all of the conveyors. Computer means are electrically coupled to the speed regulating means for providing a predetermined conveyor system speed set point.

In further accordance with the present invention are part detector means that are electrically coupled to the computer means, for verifying each part's progress along each of the conveyors thereby enabling the computer means to track the movement of each part transported along the conveyor system to detect part to part collisions.

In still further accordance with the present invention, the computer means includes means for simulating a relative position as a function of time when each part should be detected by the part detector means. The computer means detects a part to part collision on one of the conveyors when a part is not detected at the relative position as a function of time simulated by the computer means. The computer means then stops the conveyors behind the conveyor with the detected part to part collision.

Also in accordance with the present invention, a method for synchronizing a conveyorized transport system that transports parts through a plurality of processing areas, the transport system including a plurality of conveyors, each of the conveyors for transporting parts through an associated one of the processing areas. The method comprises the steps of providing a predetermined conveyor system speed set point and monitoring the speed of each of the motors. The speed of each of the motors is compared with the predetermined conveyor system speed set point and the speed of each of the conveyors is selectively adjusted to the speed set point to synchronize the speed among all of the conveyors.

In further accordance with the method of the present invention, there is described a step of scanning a region of each conveyor, to track the movement of each part transported along that conveyor to detect part to part collisions thereon.

DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Figure 1:
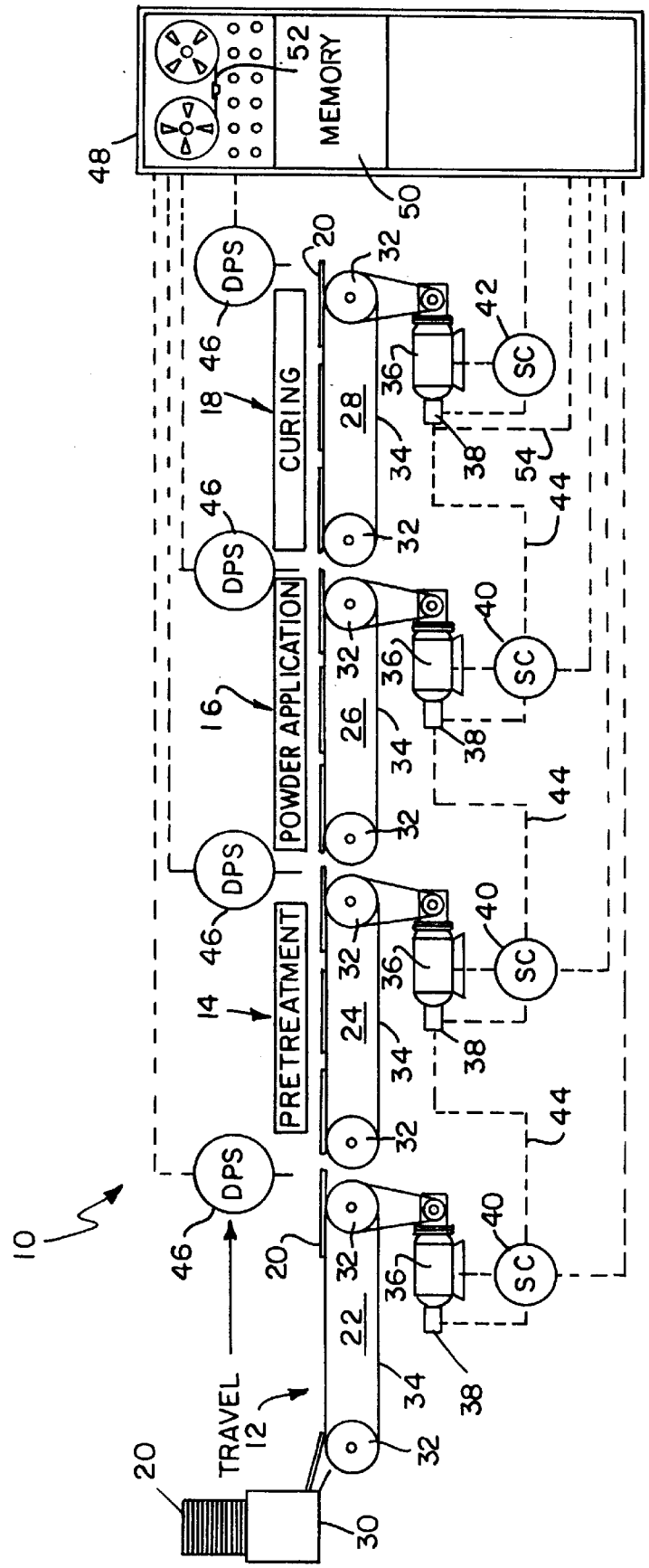
FIG. 1 is a schematic view of an exemplary embodiment of a blank powder coat finishing process implemented with an in line conveyorized transport system that employs the conveyor synchronization and anti-jaming technique of the present invention.

The conveyor synchronization and anti-jamming technique of the present invention is intended especially for the high speed conveyorized transports systems used in blank powder coat finishing processes. However, the technique of the present invention is equally applicable to other conveyorized transport systems.

As discussed above, synchronization and accurate speed control of the high speed transport system used in blank powder coat finishing processes is critical for consistent substrate exposure time to pretreatment chemicals, cure time, and for uniform thickness of the thin film powder coating. As will be explained further on, the conveyor synchronization and anti-jamming technique of the present invention provides such synchronization and accurate speed control. Additionally, the technique of the present invention maximizes the substrate's exposure in the individual processing areas by minimizing the gaps between the individual substrates. This is accomplished in the present invention by providing substrate progress verification at selected intervals along the high speed transport system. Substrate progress verification prevents equipment damage and detects substrate to substrate collisions.

Referring now to FIG. 1, an exemplary embodiment of a blank powder coat fmishing process is depicted. The blank powder coat finishing process is implemented with an in line conveyorized transport system 10 that employs the conveyor synchronization and anti-jamming technique of the present invention. The finishing process comprises a plurality of processing areas including a substrate in feed area 12, a substrate pretreatment processing area 14, a powder application processing area 16, and a powder curing processing area 18. Prior to finishing, sheets made from cold-rolled steel, zinc/aluminum-coated steel, zinc-coated galvanized steel and the like are stamped into a plurality pre-cut blanks 20. Each pre-cut blank or substrate 20 includes all the requisite cut-outs, holes, notches and the like, formed therein. The pre-cut substrates 20 are stored at the substrate in feed area 12. A pre-cut substrate 20 can be up to 16 feet long and 4 feet wide. The pre-cut substrates 20 are transported through the processing areas on the conveyorized transport system 10 which consists of an in feed conveyor 22, a pretreatment conveyor 24, a powder application conveyor 26 and a powder curing conveyor 28.

A conventional automated part feeder 30 places the pre-cut substrates 20 onto the in feed conveyor 22 which continuously feeds the pre-cut substrates 20 into the system 10. The substrates 20 first enter the substrate pretreatment processing area 14 which includes standard washing equipment for removing oil and residual dirt from each substrate and then sealing each substrate with a "dry-in-place" type of sealant, a chrome type of sealant or a non-chrome type of sealant. A conventional high velocity convection dry-off oven is used to dry each substrate and then high velocity refrigerated air is blown over the substrates to cool them below approximately 95° F. before they leave the substrate pretreatment processing area 14.

The pre-cut substrates 20 then enter the powder coating processing area 16 which has standard equipment for applying a uniform 1.4 to 1.6 mil layer of paint powder on the pre-cut substrates 20. The powder coating equipment allows for quick color changes.

The powder coated pre-cut substrates 20 then enter the powder curing processing area 18. Since conveyor line speeds of up to 80 feet per minute are commonly employed in the blank powder coating finishing systems, infrared (IR) enhance convection heating equipment is used in the powder curing processing area 18. The IR heating equipment provides fast and carefully controlled temperature ramp-up which melts the powder layer applied to the substrates so that it begins to flow almost immediately. The IR enhanced convection heating equipment includes a pre-heat zone where high-purity electric IR emitters provide an isolated, non-contaminating environment with rapid temperature ramp-up of the powder coating and the substrate. A equalization zone combines IR and high-velocity indirect natural gas convection heat to produce temperatures of 500 to 650° F. A holding zone uses convection heating only that maintains all surfaces at a predetermined temperature based on specific cure requirements of the powder used.

Each conveyor 22, 24, 26, 28 includes a pair of rollers 32 coupled together by a looped conveyor belt 34. A motor 36 is coupled to one of the rollers 32 to drive the conveyor. The motor 36 includes a digital motor shaft encoder 38 attached thereto that monitors the rotational speed of the motor shaft (not visible). The substrate in feed conveyor 22, the substrate pretreatment conveyor 24, and the powder application conveyor 26, each have a slaved closed loop motor speed controller 40 that is wired to the conveyor's respective motor 36 and digital motor shaft encoder 38, to maintain accurate conveyor speed regulation. The powder curing conveyor 28 is provided with master closed loop speed controller 42 that is wired to its respective motor 36 and encoder 38.

Synchronization of the conveyor system 10 is provided in the following manner. The master closed loop speed controller 42 provides a speed reference that the slaved closed loop motor speed controllers 40 must follow. This is accomplished by providing a lead signal connection that electrically couples a following conveyor controller 40 with a leading conveyor encoder 38. Accordingly, the slaved closed loop speed controllers 40 synchronize themselves to the conveyor they follow.

Anti-jamming capabilities are provided in the conveyor system 10 by including a part detector sensor 46 for monitoring the location of each pre-cut substrate 20 in each processing area of the system. Each part detector sensor 46 is positioned at the output of an associated conveyor 22, 24, 26, 28, just above the conveyor's conveyor belt 34. A computer 48 with a memory 50 is electrically coupled to each of the slave closed loop motor speed controllers 40, the master closed loop motor speed controller 42, the digital motor shaft encoder 38 of the powder curing conveyers motor 36 and each of the part detector sensors 46. The computer 48 includes a program 52 that provides a conveyor line speed set point to the master closed loop motor speed controller 42, based on substrate position verification signals received from the part detector sensors 46 located at the outputs of each of the conveyors 22, 24, 26, 28. The part detector sensors 46 operate in conjunction with the program 52 to enable the computer 48 to detect substrate to substrate collisions and respond accordingly to prevent or substantially reduce jam-ups, as will be explained further on.

In operation, the automated part feeder 30 places the pre-cut substrates 20 onto the in feed conveyor 22 at precise predetermined time intervals which produces a typical substrate spacing of 2 to 3 inches. Each newly placed substrate 20 travels along the in feed conveyor 22 and is sensed by the part detector sensor 46 at the output of the in feed conveyor 22. As each substrate 20 passes the in feed conveyor part detector sensor 46, a position signal indicative of that substrate is generated by this sensor which is read by the computer 48 and then stored in the computer's memory 50 as an image of that substrate. The computer 48 then calculates the overall system conveyor belt speed from information obtained from the master digital motor shaft encoder via electrical connection 54 to predict or calculate the relative position as a function of time where each imaged substrate should be detected by a part detector sensor 46 at the output of a subsequent conveyor of the system 10. The predicted schedule of relative position as a function of time for each pre-cut substrate 20 is then stored in the computer's memory 50. In other words, the computer's memory 50 mimics a substrate path through the synchronized conveyor system 10 by reading the digital motor shaft encoder 38 of the powder curing conveyor 28 and using this information to move an image of each substrate through the computer's memory 50 at the same rate at which the substrate moves along the conveyor system 10. The computer 48 also expects the individual substrates to appear at the part detector sensors 46 as predicted by the memory 50. Failure of a substrate to appear at a particular part detector sensor will be read by the computer 48 as a jam-up on that conveyor. The computer 48 responds to this by stopping the conveyors located behind the conveyor with the jam-up and enunciating a-jam condition alarm.

The conveyor synchronization and anti-jamming technique of the present invention maximizes each substrate's exposure in the individual processing areas by minimizing the gaps between the individual substrates. The present invention also substantially reduces the severity of jam-ups in a blank powder coating finishing system. Since jam-ups are detected automatically, the number of operators needed to operate the system is substantially reduced. Furthermore, since jam-up detection is performed automatically, the remaining operators can react quickly to the jam-ups when they do occur to maximize throughput.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A conveyor system for transporting parts through a plurality of processing areas, comprising:

a plurality of conveyors, each of said conveyors for transporting parts through an associated one of said processing areas;

speed monitoring means for monitoring the speed of said conveyors;

speed control means electrically coupled to said speed monitoring means and responsive thereto, for regulating the speed of said conveyors thereby synchronizing the speed among all of said conveyors;

part detector means for verifying each part's progress along each of said conveyors;

computer means electrically coupled to said part detector means and speed regulating means for tracking the movement of each part transported along the conveyor system to detect part to part collisions and providing a predetermined conveyor system speed set point.

2. The conveyor system as recited in claim 1, wherein said computer means includes means for calculating a time each part should be detected by said part detector means, said computer means detecting a part to part collision on one of said conveyors when a part is not detected at said time calculated by said computer means, wherein said computer means stops said conveyors behind said conveyor with the detected part to part collision.

3. The conveyor system as recited in claim 2, wherein said computer means includes a memory for storing said relative position as a function of time simulated by said computer means for each part transported along said conveyor system.

4. The conveyor system as recited in claim 2, wherein said computer means includes means for enunciating an alarm when a part to part collision is detected.

5. The conveyor system as recited in claim 1, wherein said conveyors are arranged in an in line manner.

6. A conveyor system for transporting pre-cut substrates through a blank powder coat finishing process having a pretreatment processing area, a powder application processing area, and a powder curing processing area, said conveyor system comprising:

a plurality of conveyors, each of said conveyors associated with one of said processing areas for transporting pre-cut substrates therethrough, each of said conveyors being driven by a motor;

a digital encoder associated with each of said motors for monitoring the speed thereof;

a motor speed controller electrically coupled to each of said motors and said motor's corresponding digital encoder, each of said motor speed controllers regulating the speed of its associated conveyor;

one of said motor speed controllers being a master controller and the other motor speed controller being a slave controller; and a computer electrically coupled to said master motor speed controller for providing a predetermined conveyor system speed set point, wherein said digital encoder of said master motor speed controller operates to synchronize the speed among all of said conveyors.

7. The conveyor system as recited in claim 6, further comprising a part detector associated with each conveyor, for verifying each pre-cut substrate's progress along that conveyor, each of said part detectors electrically coupled to said computer thereby enabling said computer to track each pre-cut substrate's progress along said conveyor system to detect substrate to substrate collisions.

8. The conveyor system as recited in claim 7, wherein said computer includes timing means for simulating a relative position as a function of time when each pre-cut substrate is to be detected by said part detectors, said computer detecting a substrate to substrate collision on one of said conveyors when a pre-cut substrate is not detected at said relative position as a function of time simulated by said computer means, wherein said computer means stops said conveyors behind said conveyor with the detected part to part collision.

9. The conveyor system as recited in claim 8, wherein said computer includes a memory for storing said relative position as a function of time simulated by said computer means for each pre-cut substrate transported along said conveyor system.

10. The conveyor system as recited in claim 8, wherein said computer includes means for enunciating an alarm when a pre-cut substrate is not detected at said relative position as a function of time simulated by said computer means.

11. The conveyor system as recited in claim 6, wherein said conveyors are arranged in an in line manner.

12. A method for synchronizing a conveyorized transport system that transports parts through a plurality of processing areas, said transport system including a plurality of conveyors, each of said conveyors for transporting parts through an associated one of said processing areas, the method comprising the steps of:

providing a predetermined conveyor system speed set point;

monitoring the speed of each of said motors;

comparing the speed of each of said motors with said predetermined conveyor system speed set point;

selectively adjusting the speed of each of said conveyors to said speed set point to synchronize the speed among all of said conveyors;

scanning a region of each conveyor to track the movement of each part transported along that conveyor to detect part to part collisions thereon; and adjusting the speed of the conveyors for a detected collision.

13. The method as recited in claim 12 further comprising the step of calculating times at which each part should be detected at said regions of said conveyors.

14. The method as recited in claim 13, further comprising the step of stopping said conveyors behind a conveyor when a part is not detected at said conveyor's scanned region at said relative position as a function of time.

15. The method as recited in claim 13, further comprising the step of storing said relative position as a function of time for each part transported along said conveyor system.

16. The method as recited in claim 13, further comprising the step of enunciating an alarm when a part to part collision is detected.

17. The method as recited in claim 12, wherein said conveyors are arranged in an in line manner.

18. The method as recited in claim 12, wherein said plurality of processing areas comprise a blank powder coat finishing process having a pretreatment processing area, a powder application processing area, and a powder curing processing area.

* * * * *